United States Patent

Lee et al.

[11] Patent Number: 5,537,384
[45] Date of Patent: Jul. 16, 1996

[54] FOCUS ERROR DETECTOR

[75] Inventors: Chul-woo Lee, Seoul; Chong-sam Chung, Sungnam; Jan-hoon Yoo; Kyung-hwa Rim, both of Seoul, all of Rep. of Korea

[73] Assignee: Samsung Electronics Co., Ltd., Kyungki-do, Rep. of Korea

[21] Appl. No.: 364,983

[22] Filed: Dec. 28, 1994

[30] Foreign Application Priority Data

Jun. 30, 1994 [KR] Rep. of Korea .................. 94-15686

[51] Int. Cl.$^6$ ............................................ G11B 7/00
[52] U.S. Cl. .................... 369/118; 369/44.23; 369/54; 369/58; 369/110; 369/112; 369/120
[58] Field of Search ........................... 369/44.14, 44.23, 369/54, 58, 110, 118, 112, 120, 107

[56] References Cited

U.S. PATENT DOCUMENTS

| | | | |
|---|---|---|---|
| 5,189,655 | 2/1993 | Ogata et al. | 369/112 |
| 5,383,173 | 1/1995 | Kim et al. | 369/112 |
| 5,400,314 | 3/1995 | Lee | 369/121 |
| 5,406,532 | 4/1995 | Nishikawa | 369/112 |
| 5,488,599 | 1/1996 | Akiyama et al. | 369/112 |

*Primary Examiner*—Georgia Y. Epps
*Assistant Examiner*—Kim-Kwok Chu
*Attorney, Agent, or Firm*—Leydig, Voit & Mayer

[57] ABSTRACT

A focus error detector for detecting a focus error of an objective lens with respect to an optical disk. The focus error detector includes a beam splitter for splitting light reflected from the optical disk. Two critical angle prisms having critical angle reflecting surfaces are included for respectively reflecting the light rays from the beam splitter at the respective critical angles onto two bisectional photo-detectors. The bisectional photo-detector generates detecting signals responsive to the amount of light received. The detecting signals are differentiated and added in a direction offsetting a shift or tilt of the reflected light. Accordingly, only the focus error signal is detected, irrespective of the tilt and shift of the optical axis of the reflected light. Thus, malfunction of an optical pickup is prevented, thereby providing for the uncorrupted recording and reproduction of data.

10 Claims, 9 Drawing Sheets

FOCUS ERROR DETECTOR

BACKGROUND OF THE INVENTION

The present invention relates to a focus error detector, and more particularly, a focus error detector which detects a signal representing the degree of a focus error of an objective lens with respect to the recording medium using a critical angle method. The focus error detector may be used in conjunction with an optical pickup for recording and reproducing information by scanning a recording medium using optical spots.

Figure 1:
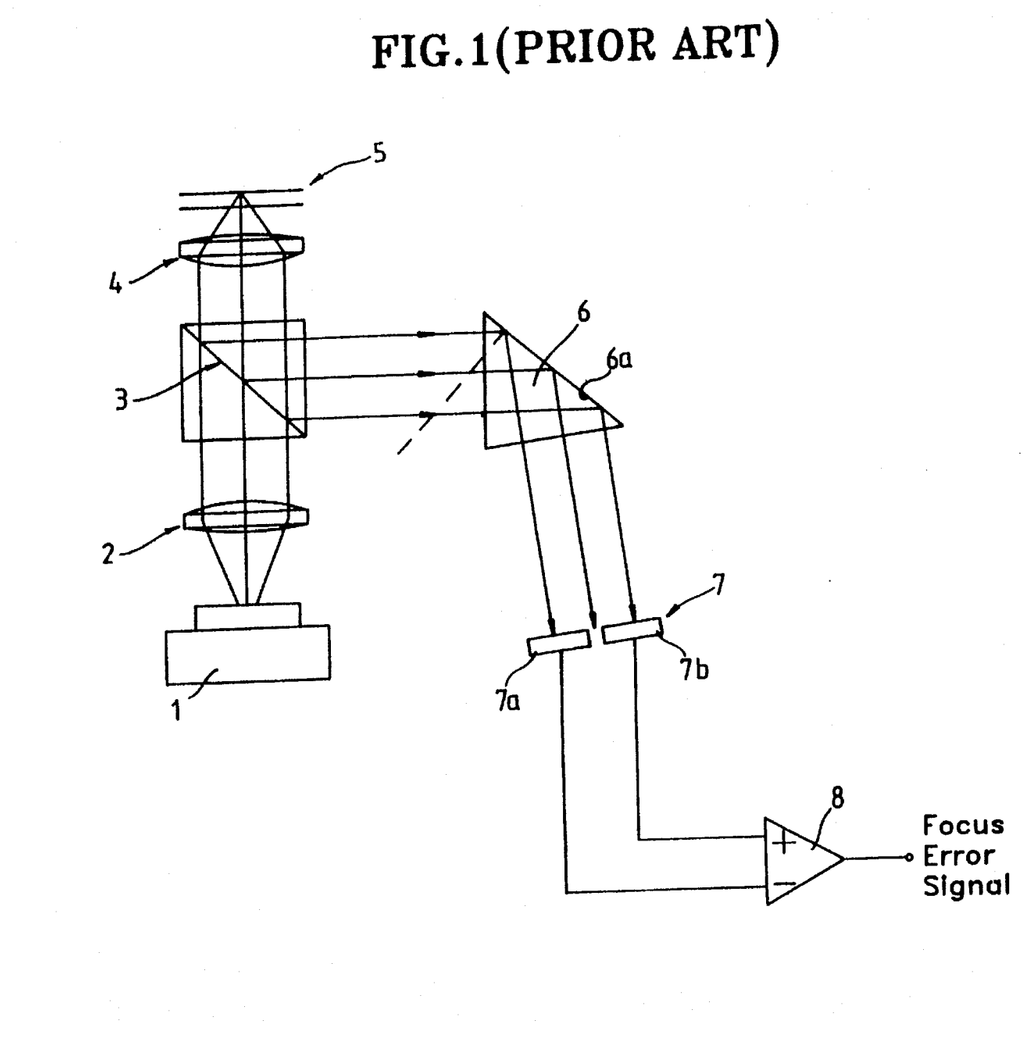
FIG. 1 is a schematic view showing the optical construction of an optical pickup adopting a conventional focus error detector.

A conventional method for detecting a focus error in an optical recording and reproducing pickup employs a critical angle method using a critical angle prism. In a focus error detector according to the critical angle method, the angle of the reflecting mirror surface of a prism is tilted to be close to a critical angle with respect to an optical axis. A simple example according to this conventional technology is shown in FIG. 1.

The light radiated from a laser diode 1 (a light source) is collimated by means of a collimating lens 2, passed through a beam splitter 3 and then directed to be incident on an objective lens 4. Thereafter, the light is focused onto an optical disk 5 by the objective lens 4. Reflected light from the optical disk 5 is collimated again via the objective lens 4, the reflected light reflects onto the beam splitter 3, and then directed toward a critical angle prism 6. Then, the light further reflects onto the critical surface 6a of the critical angle prism 6 to finally reach a bisectional photo-detector 7. A differential amplifier 8 differentiates signals of divisional sections 7a and 7b of the bisectional photo-detector 7. At this time, the polarity and magnitude of the signals of the differential amplifier 8 vary according to the degree of the focus error of the objective lens, which depend on the distance between the objective lens 4 and optical disk 5, as described in detail with reference to FIGS. 2 and 3.

Figure 2A:
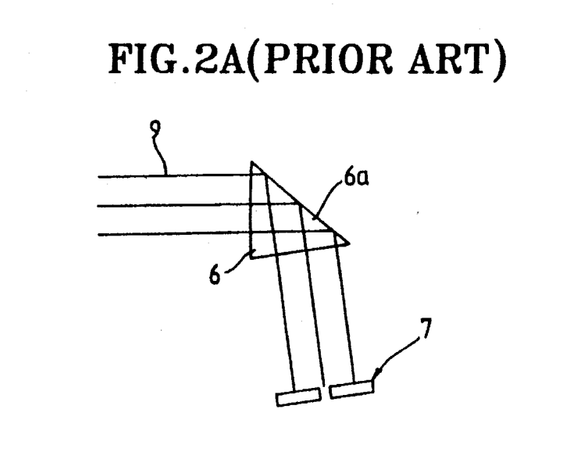
FIG. 2A is a schematic view showing an in-focus state and FIGS. 2B and 2C show out-of-focus states.
Figure 2B:
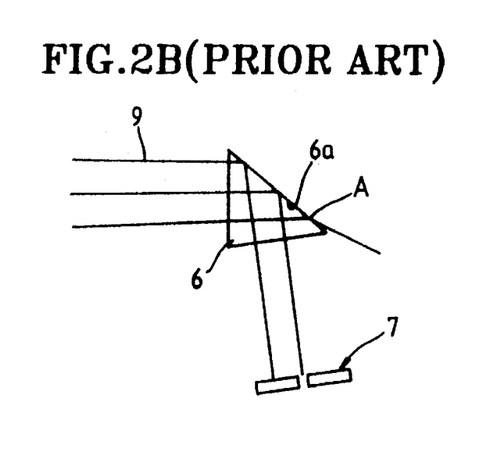
Figure 2C:
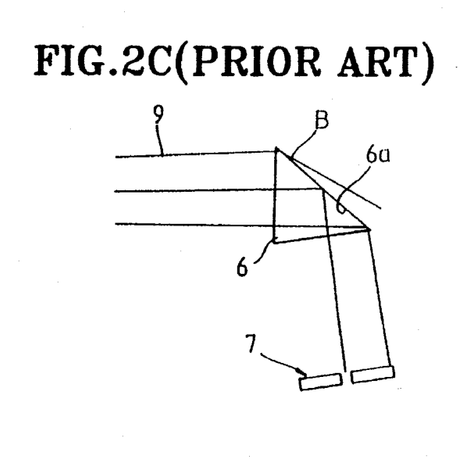
Figure 3A:
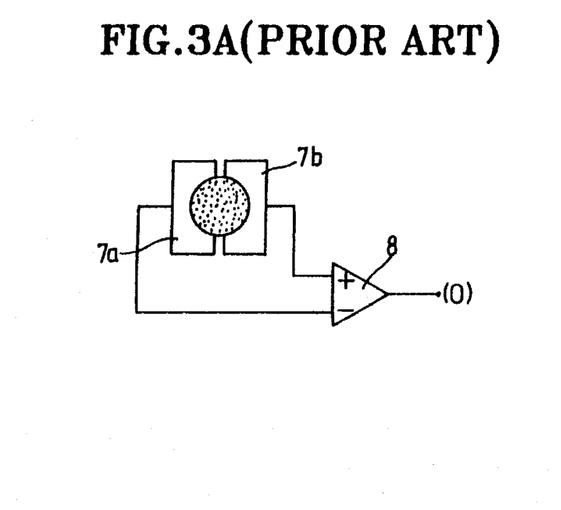
FIGS. 3A to 3C are circuit diagrams showing spots landed on a photo-detector and detected signals depending on the states of FIGS. 2A to 2C, respectively.
Figure 3B:
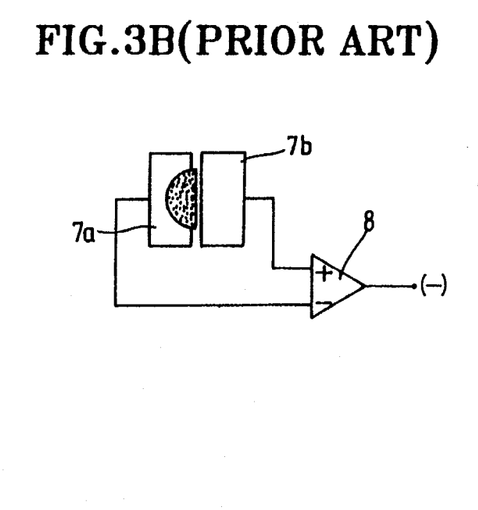
Figure 3C:
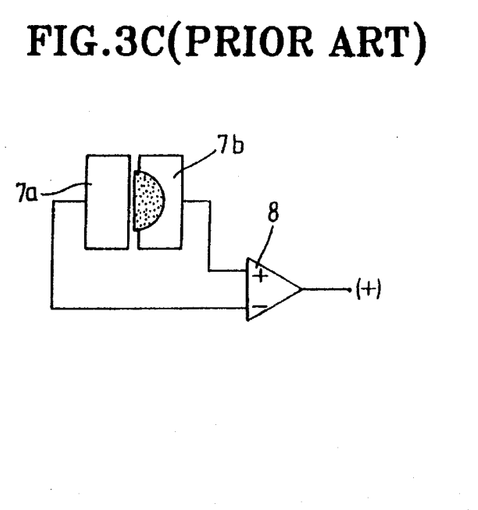

FIG. 2A shows an in-focus state, i.e., the state when the optical disk is positioned on the focal plane of the objective lens. At this time, the reflected light 9 which is collimated is totally reflected from the critical surface 6a of the critical angle prism 6. Therefore, as shown in FIG. 3A, the reflected light 9 is uniformly received by both divisional sections 7a and 7b of the photo-detector 7, and the relative input signal value of the differential amplifier 8 becomes zero. However, if the optical disk deviates from the focal plane of the objective lens, the reflected light 9 from the optical disk is converged or diverged as shown in FIGS. 2B and 2C. At this time, the reflection amount at point A or B on the critical surface 6a of the critical angle prism 6 is decreased. Therefore, as shown in FIGS. 3B and 3C, the reflected light 9 is received in a semicircular shape by one or the other of divisional sections 7a and 7b of the photo-detector 7, and the relative input signal value of the differential amplifier 8 becomes negative or positive.

Over optical disk vibration and mutation causes the optical axis of the reflected light to shifted laterally or tilt. As a result, the reflection efficiency of the critical prism with respect to the reflected light is changed. Accordingly, although the optical disk is positioned in the focal plane of the objective lens, there is a difference in the amount of light received by the respective divisional sections, which registers a disparity between the input signal values to the differential amplifier. That is to say, the focus error detector according to the conventional critical angle method recognizes the shift or tilt of the optical axis of the reflected light as a focus, which results in the malfunction of the optical pickup.

SUMMARY OF THE INVENTION

Therefore, it is an object of the present invention to provide a focus error detector which eliminates optical pickup malfunctions (focus errors), by eliminating the signal variations at the input of a photo-detector, induced by changes in the amount of light received.

To accomplish the above object, the focus error detector according to the present invention for detecting a focus error of an objective lens for focusing a parallel incident light ray onto an optical disk, the focus error detector comprising: beam splitting means for splitting the light reflected from the optical disk and passed through the objective lens, into a first reflected light ray and a second reflected light ray; critical angle reflecting means for reflecting the first and second reflected light ray at respective critical angles thereof; two bisectional photo-detectors for detecting signals depending on the received light amount by receiving the first and second reflected light rays respectively reflected by the critical angle reflecting means; and circuit means for differentiating and adding signals detected by the two bisectional photo-detectors in a direction offsetting difference in light amount due to a tilt or shift of the reflected light to then output a signal representing a degree of the focus error.

Also, to accomplish the above object of the present invention, a focus error detector for detecting a focus error of an objective lens for focusing a parallel incident light ray onto an optical disk comprises: a composite prism member combined by a plurality of prisms so as to have a splitting surface for splitting the light reflected from the optical disk and passed through the objective lens into first and second reflected light rays and at least two critical angle surfaces for reflecting the first and second reflected light rays at their respective critical angles; two bisectional photo-detectors for detecting signals depending on the received light amount by receiving the first and second reflected light rays reflected by the at least two critical angle surfaces; and circuit means for differentiating and adding the signals detected by the two bisectional photo-detectors in a direction offsetting difference in the light amount due to a tilt or shift of the reflected light to then output a signal representing a degree of the focus error.

Further, to accomplish the above object of the present invention, a focus error detector for detecting focus error of an objective lens for focusing a parallel incident light ray onto an optical disk comprises: a beam splitting member having a polarizing beam splitting surface for reflecting totally the light reflected from the optical disk and passed through the objective lens in accordance with a polarization direction of the light and for transmitting all the light returning along the reflection path therethrough; two critical angle prisms each having a critical angle reflecting surface so as to reflect the light reflected in the polarizing beam splitting surface at each critical angle in turn; a semitransmissive mirror for transmitting part of the reflected light passing through the two critical angle prisms therethrough and for reflecting the rest of the reflected light back from the mirror; a wave plate for rotating a polarization direction of the light reflected back from the semitransmissive mirror; two bisectional photo-detectors for detecting signals depending on the received light amount by respectively receiving part of the light transmitted via the semitransmissive mirror and reflected from the critical angle reflecting surface of one critical angle prism and the rest of the light reflected from the semitransmissive mirror and passing through the critical angle reflecting surface of the other critical angle prism and the polarizing beam splitting surface; circuit means for differentiating and adding the signals detected by the two bisectional photo-detectors in a direction offsetting difference in the light amount due to a tilt or shift of the reflected light to then output a signal representing a degree of the focus error.

BRIEF DESCRIPTION OF THE DRAWINGS

The above objects and advantages of the present invention will become more apparent by describing in detail preferred embodiments thereof with reference to the attached drawings in which:

FIGS. 2A to 2C illustrate the principle of detecting a focus error in the conventional focus error detector, in which

FIGS. 5A to 5C show the principle of detecting a focus error in the focus error detector according to the present invention, in which

DETAILED DESCRIPTION OF THE INVENTION

Figure 4:
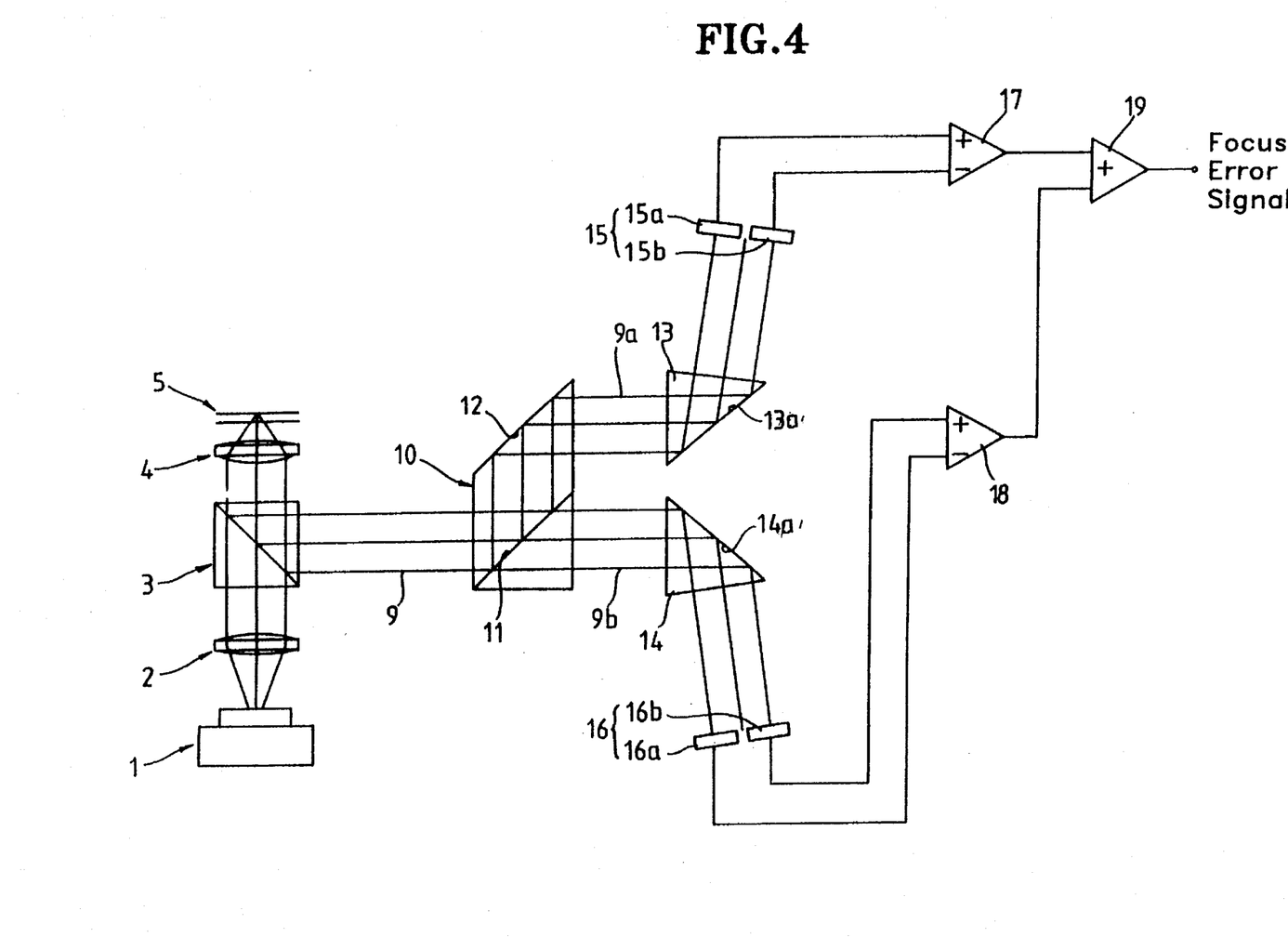
FIG. 4 is a schematic view showing an optical construction of the optical pickup adopting a focus error detector according to a first embodiment of the present invention.

In FIG. 4, a pickup includes (conventionally) a laser diode 1, a collimating lens 2, a beam splitter 3 and an objective lens 4, as shown in FIG. 1. The focus error detector according to a first embodiment of the present invention for use in the aforementioned pickup includes a beam splitting member 10 having two prism elements The two prism elements combine to form a splitting surface 11 for splitting the reflected light ray 9 reflected from the beam splitter 3 into first and second reflected light rays 9a and 9b. The two prism elements also combine to form a reflecting surface 12 for reflecting the first reflected light ray 9a in parallel with the second reflected light ray 9b. Two critical angle prisms 13 and 14 are arranged in the optical paths of the first and second reflected light rays 9a and 9b. The two critical angle prisms 13, 14 are respectively coupled to two bisectional photo-detectors. The two bisectional photo-detectors detect signals depending on amount of light received from the first and second reflected light rays which have passed through the two critical angle prisms 13 and 14. Two differential amplifiers 17 and 18 are respectively coupled to the two -bi-sectional photo-detectors for respectively differentiating the signals detected by the two bisectional photo-detectors 15 and 16. A summing amplifier 19 is coupled to the two differential amplifiers 17, 18 for adding the signals differentiated by the two differential amplifiers 17 and 18. Here, reference numerals 13a and 14a each designate a critical reflecting surface of the critical angle prisms 13 and 14, respectively. Reference numeral 15a, 15b, 16a and 16b each designate divisional sections of the bisectional photo-detectors 15 and 16, respectively.

Referring to FIG. 4, the reflected light ray 9 passing through the objective lens 4 and beam splitter 3 (after being reflected from the optical disk 5) is split into first and second reflected light rays 9a and 9b at the splitting surface 11 of beam splitting member 10. The second reflected light ray 9b travels straight to one critical angle prism 14, and the first reflected light ray 9a is reflected from the reflecting surface 12 of beam splitting member 10 and then travels toward the other critical angle prism 13 in parallel with the second reflected light ray 9b. Also, the first and second reflected light rays 9a and 9b are reflected from the respective critical angle reflecting surfaces 13a and 14a of the critical angle prisms 13 and 14 to then reach the two photo-detectors 15 and 16, respectively. Then, the differential amplifiers 17 and 18 differentiate the signals detected in the divisional sections 15a, 15b, 16a and 16b of the photo-detectors 15 and 16 connected thereto, respectively. The summing amplifier 19 adds and outputs the outputs of the differential amplifiers 17 and 18.

Figure 5A:
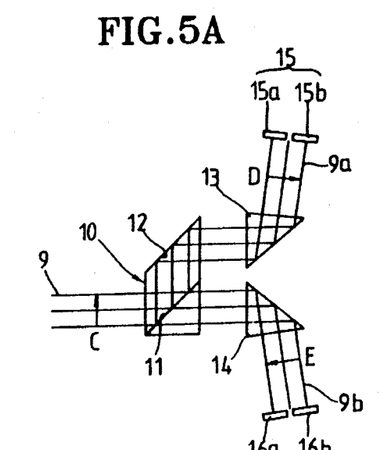
FIG. 5A is a schematic view showing an in-focus state and FIGS. 5B and 5C show out-of-focus states.
Figure 6A:
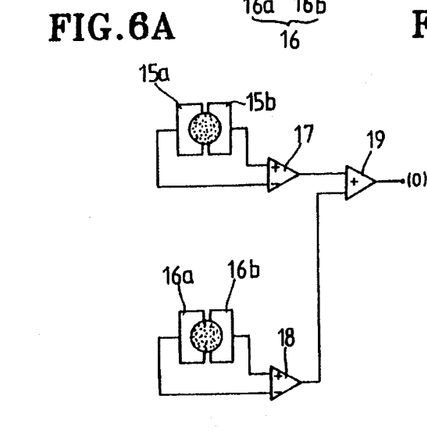
FIGS. 6A to 6C are circuit diagrams showing spots landed on a photo-detector and detected signals depending on the states of FIGS. 5A to 5C, respectively.

FIG. 5A shows the state when the optical disk is positioned in the focal plane of the objective lens. In this case, the reflected light ray 9 incident on the beam splitting member 10 is split into the first and second parallel reflected light rays 9a and 9b by the splitting surface 11, respectively. The first and second reflected light rays 9a and 9b are totally reflected from the critical angle reflecting surfaces 13a and 14a of the two critical angle prisms 13 and 14. Therefore, as shown in FIG. 6A, the first and second reflected light rays 9a and 9b are homogeneously disposed on the divisional sections 15a, 15b, 16a and 16b of the photo-detectors 15 and 16. At this time, the outputs of the differential amplifiers 17 and 18 and the output of the summing amplifier 19 are all zero.

In the state as shown in FIG. 5A, if the optical axis of the reflected light ray 9 is tilted or shifted in the "C" direction, the first reflected light ray 9a is shifted in the "D" direction, i.e., from one splitting section 15a of the photo-detector 15 to the other splitting section 15b. Also, the second reflected light ray 9b is shifted from the other splitting section 16b of the photo-detector 16 to one splitting section 16a. In other words, the light amount received by splitting section 15a of photo-detector 15 is reduced and the light amount received by splitting section 15b of photo-detector 15 is increased relatively. Also, the light amount received by splitting section 16a of photo-detector 16 is increased and the light amount received by splitting section 16b of photo-detector 16 is decreased relatively. However, the detected signals of the respective divisional sections 15a, 15b, 16a and 16b according to the change of light amount depending on the relative decrease and increase are offset with each other by the differential amplifiers 17 and 18 and the summing amplifier 19. Therefore, the tilt or shift of the reflected light does not generate an error.

Figure 5B:
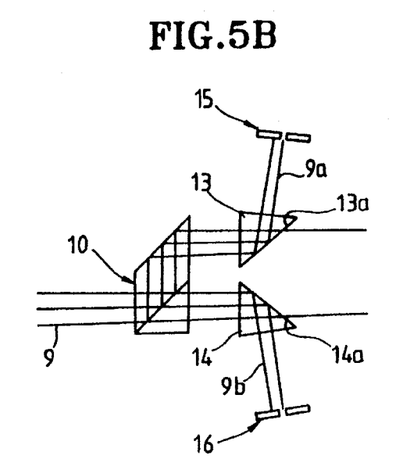
Figure 5C:
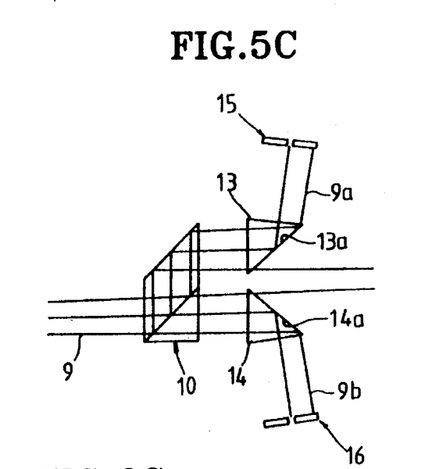
Figure 6B:
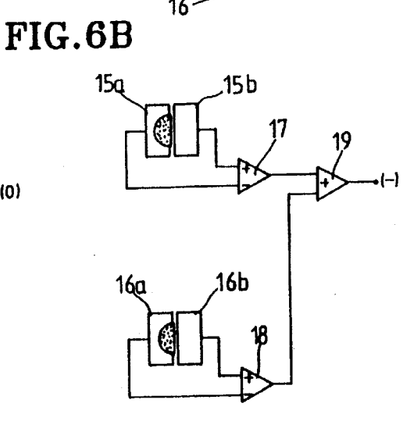
Figure 6C:
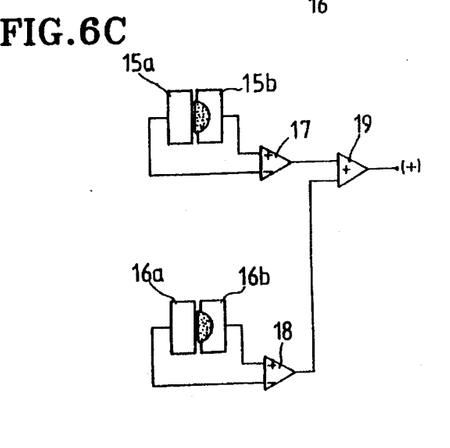

Next, FIGS. 5B and 5C show the states of a disk being too far and too close, respectively, that is, out of focus. In this case, the reflected light ray 9 (9a and 9b) is converged or diverged. The first and second reflected light rays 9a and 9b are not reflected from a point "A" or "B" on the critical angle reflecting surfaces 13a and 14a of the two critical angle prisms 13 and 14, but is transmitted. Therefore, as shown in FIGS. 6B and 6C, the first and second reflected light rays 9a and 9b are landed in a semicircular shape in the divisional sections 15a, 15b, 16a and 16b of the photo-detectors 15 and 16. At this time, the outputs of the differential amplifiers 17 and 18 and the output of the summing amplifier 19 are all negative or positive, i.e., not zero.

Next, FIGS. 7 to 12 show various construction examples of the focus error detector according to the present invention which is provided with a composite prism for performing the functions as the beam splitting member and critical angle prism.

Figure 7:
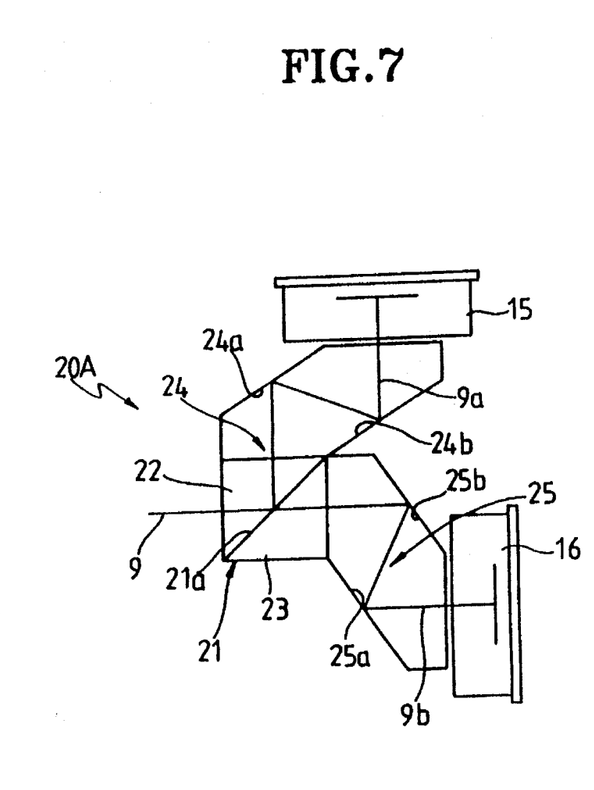
FIG. 7 is a schematic view showing the focus error detector according to a second embodiment of the present invention.

FIG. 7 shows the focus error detector according to a second embodiment of the present invention, which includes a first composite prism 20A and two photo-detectors 15 and 16. The first composite prism 20A is composed of four prism elements. That is, the first composite prism 20a is provided in combination with a beam splitting member 21 having two orthogonal prisms 22 and 23 joined to have a splitting surface 21a of the joining portion, and two critical angle prisms 24 and 25 attached to the respective radiation surfaces of the orthogonal prisms 22 and 23 and each having two critical angle reflecting surfaces 24a & 24b and 25a & 25b.

The incident reflected light ray 9 is split into first and second reflected light rays 9a and 9b at the splitting surface 21a. The first reflected light ray 9a passes through the critical angle reflecting surfaces 24a and 24b of one critical prism 24, in turn, to then be received by photo-detector 15. The second reflected light ray 9b passes through the critical angle reflecting surfaces 25a and 25b of the other critical prism 25, in turn, to then be received by photo-detector 16.

Figure 8:
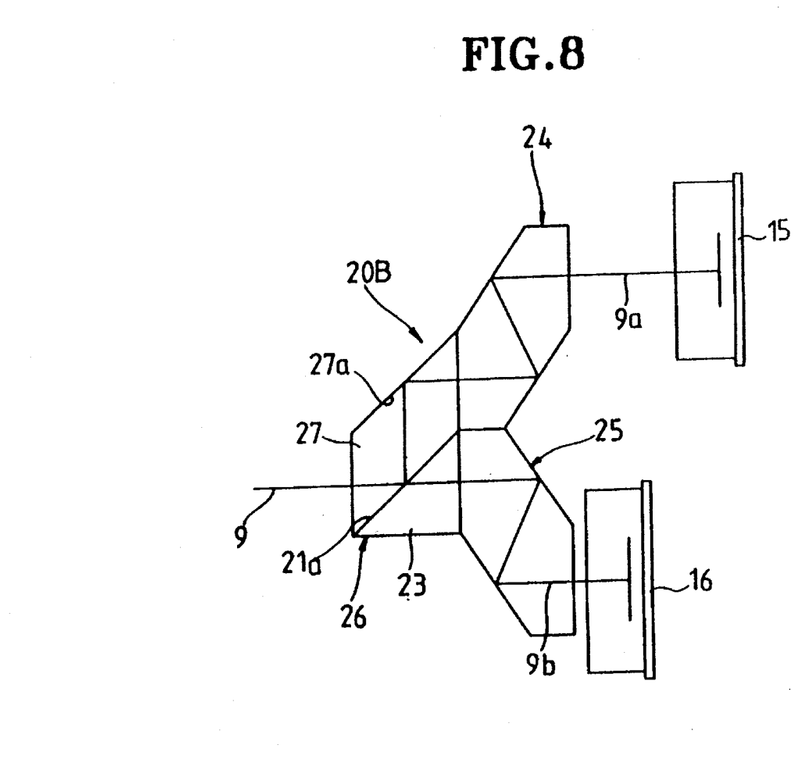
FIG. 8 is a schematic view showing the focus error detector according to a third embodiment of the present invention.

FIG. 8 shows the focus error detector according to a third embodiment of the present invention, which includes a second composite prism 20B and two photo-detectors 15 and 16. The second composite prism 20B is also composed of four prism elements: an orthogonal prism 23, a beam splitting member 26 joined the orthogonal prism 23 to form a splitting surface 21a and having a parallelogram reflective prism 27 having a reflecting surface 27a for reflecting the first reflected light ray 9a reflected from the splitting surface 21a so as to be parallel with the second reflected light ray 9b, and two critical angle prisms 24 and 25.

Figure 9:
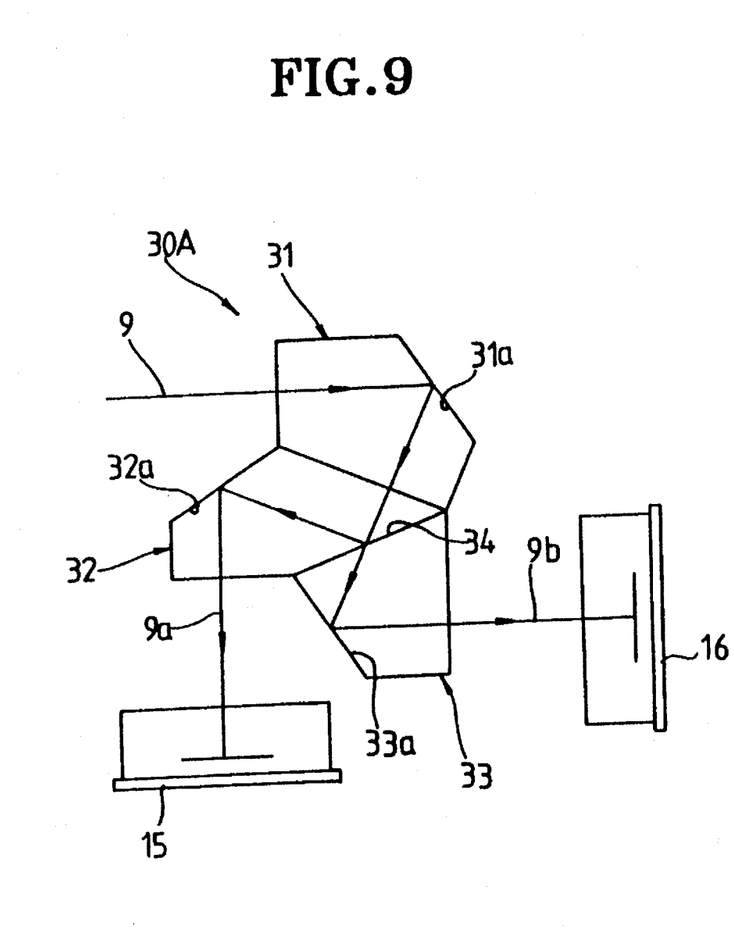
FIG. 9 is a schematic view showing the focus error detector according to a fourth embodiment of the present invention.

FIG. 9 shows the focus error detector according to a fourth embodiment of the present invention, which includes by a third composite prism 30A and two photo-detectors 15 and 16. The third composite prism 30A includes combination of sequentially joined first, second and third critical angle prisms 31, 32 and 33 and has critical angle reflecting surfaces 31a, 32a and 33a, respectively provided in the prisms, and a splitting surface 34 formed in the joining portion of the second and third critical angle prisms 32 and 33.

Here, the incident light ray 9 is split into first and second reflected light rays 9a and 9b after being reflected from the critical angle reflecting surface 31a of the first critical angle prism 31 at the critical angle. The first and second reflected light rays 9a and 9b each are reflected from the respective critical angle reflecting surfaces 24a and 24b to then travel toward the respective photo-detectors 15 and 16.

Figure 10:
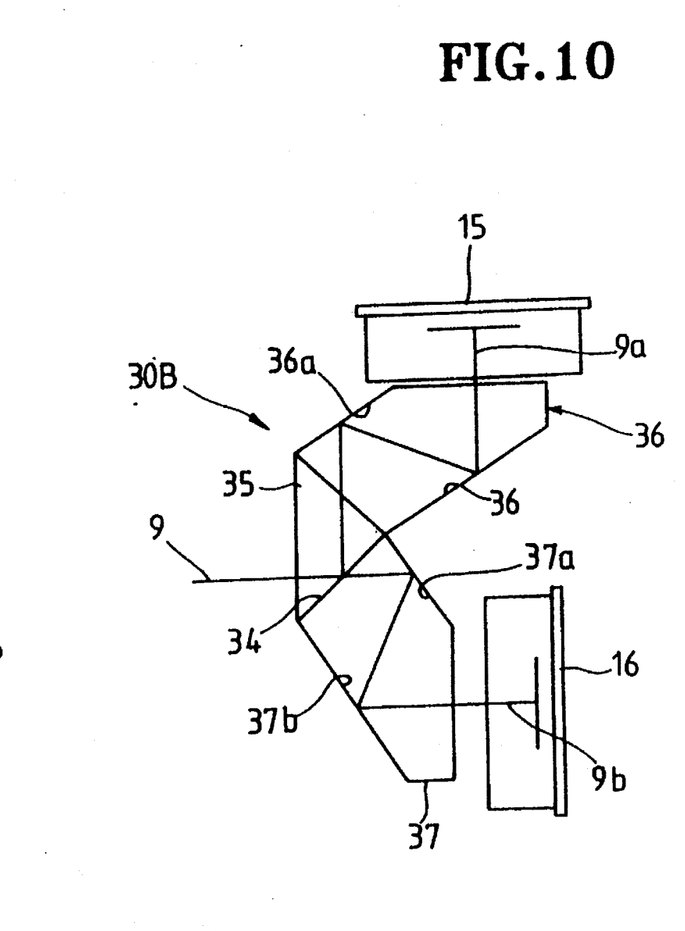
FIG. 10 is a schematic view showing the focus error detector according to a fifth embodiment of the present invention.

FIG. 10 shows the focus error detector according to a fifth embodiment of the present invention, which includes a fourth composite prism 30B. The fourth composite prism 30B includes three prism elements configured as an orthogonal prism 35 and two critical angle prisms 36 and 37 each having two critical angle reflecting surfaces 36a & 36b and 37a & 37b. A splitting surface 34 is formed in the joining portion of the orthogonal prism 35 and the critical angle prism 37.

Figure 11:
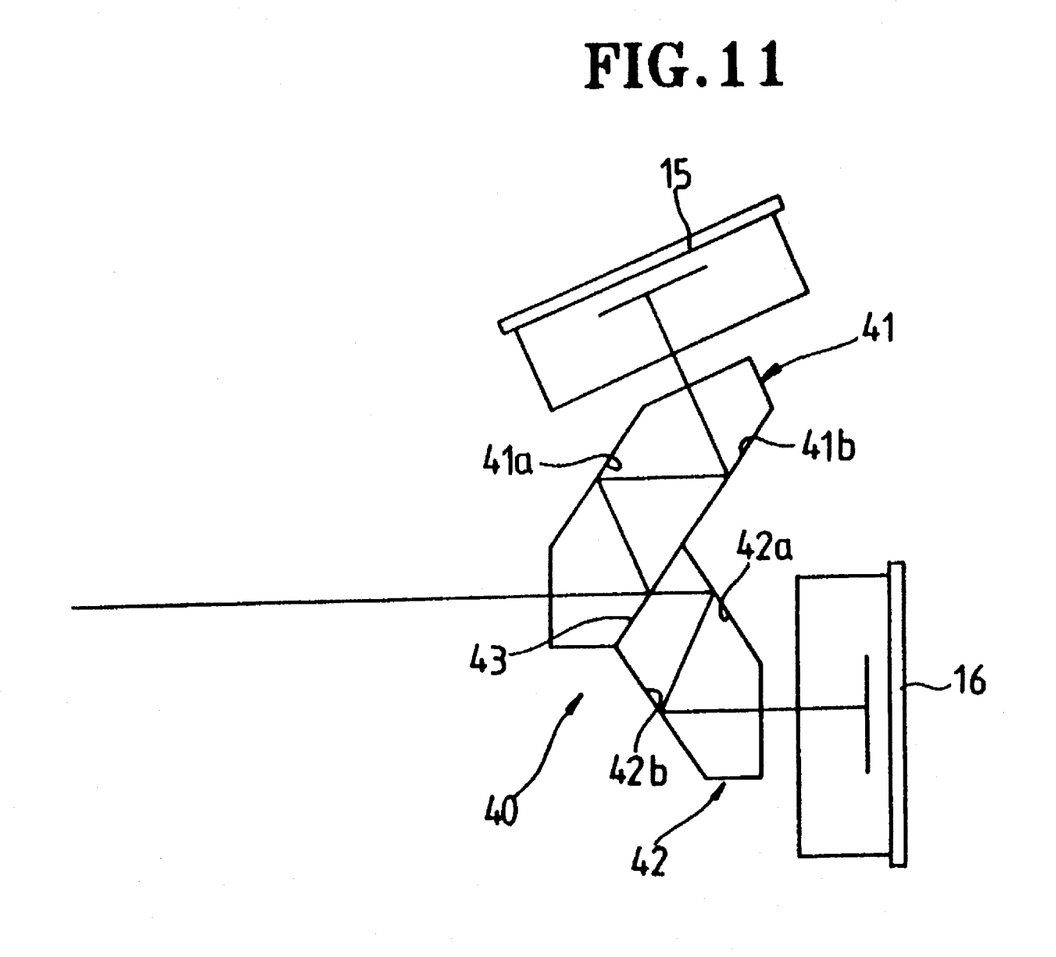
FIG. 11 is a schematic view showing the focus error detector according to a sixth embodiment of the present invention.

FIG. 11 shows the focus error detector according to a sixth embodiment of the present invention, which includes a fifth composite prism 40 provided in combination with two critical angle prisms 41 and 42. Here, a splitting surface 43 is folded in the joining portion of two critical angle prisms 41 and 42, having critical angle reflecting surfaces 41a & 41b and 42a & 42b each pair of which are formed in the respective critical angle prisms 41 and 42.

Figure 12:
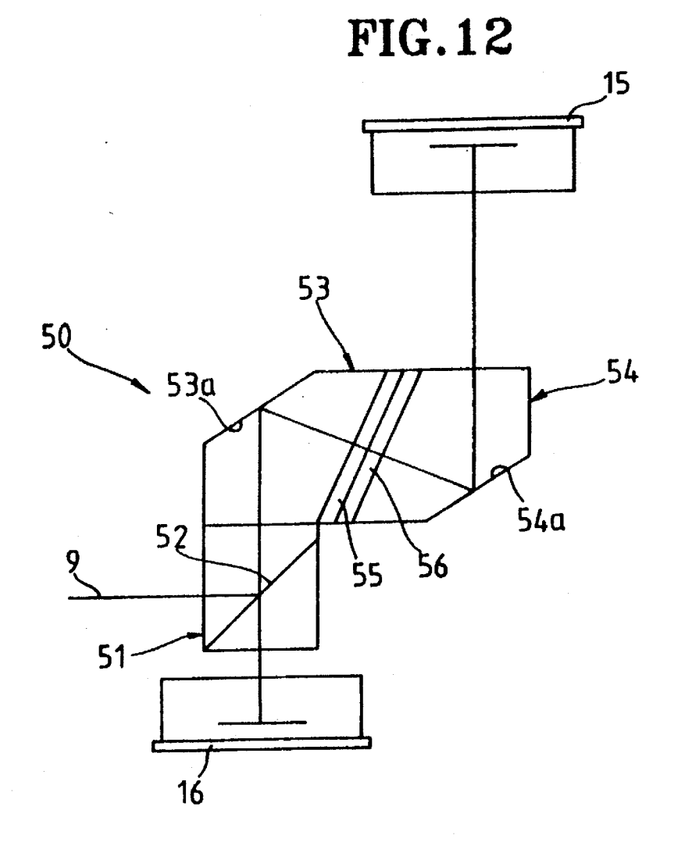
FIG. 12 is a schematic view showing the focus error detector according to a seventh embodiment of the present invention.
Figure 13A:
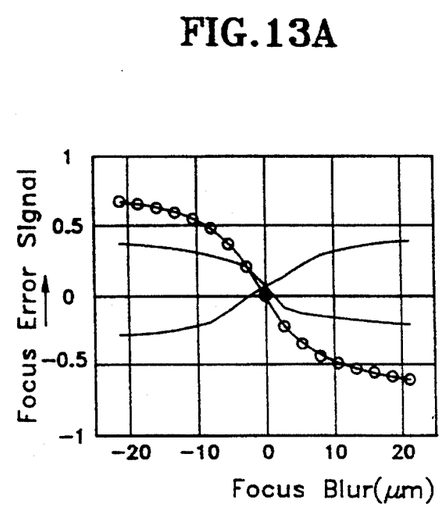
FIGS. 13A to 13D are graphs showing the calculated values of the focus detecting signal for the focus error signal detected by means of the focus error detector according to the present invention, depending on the respective conditions.
Figure 13B:
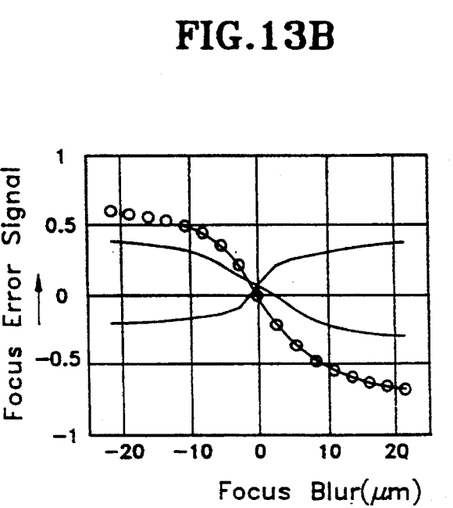
Figure 13C:
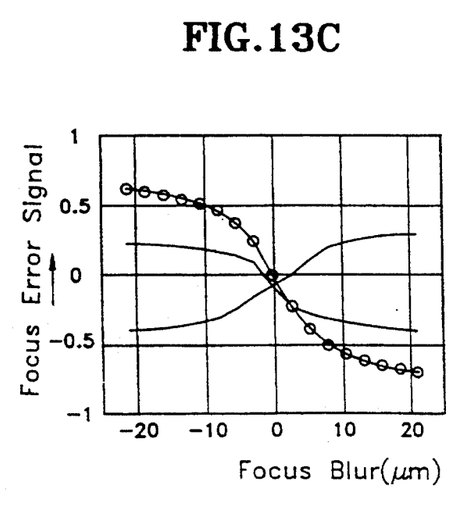
Figure 13D:
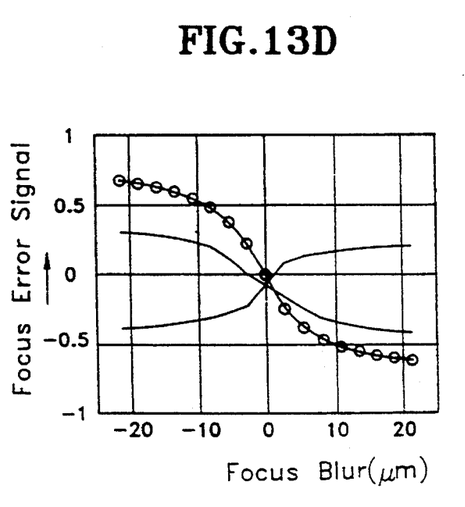

FIG. 12 shows the focus error detector according to a seventh embodiment of the present invention, which includes by a sixth composite prism 50. The sixth composite prism 50 is formed by combining a beam splitting member 51 having a polarizing beam splitting surface 52, two critical angle prisms 53 and 54 each having a critical angle reflecting surface 53a 54a, and a quarter wave plate 55 and semitransmissive mirror 56 sequentially interposed between the two critical angle prisms 53 and 54.

The aforementioned polarizing beam splitting surface 52 totally reflects the incident reflected light ray 9 depending on the polarization direction thereof but totally transmits the reflected light returning along the reflection path. The semitransmissive mirror 56 reflects parts of the reflected light ray 9, while the quarter wave plate 55 rotates the polarization direction of the parts of the reflected light ray 9 reflected back therefrom. Incident reflected light ray 9 is totally reflected from the polarizing beam splitting surface 52 to then be directed toward the critical angle reflecting surface 53a of critical prism 53, quarter wave plate 55 and semitransmissive mirror 56. Thus, parts of the reflected light ray 9 through the semitransmissive mirror 56 passes through the critical angle reflecting surface 54a of critical prism 54 to then be received by photo-detector 15. The rest of the reflected light ray 9 reflects from semitransmissive mirror 56 to pass through the quarter wave plate 55 and the critical angle reflecting surface 53a again, and thereafter, wholly transmits the polarizing beam splitting surface 52 to then be received by the other photo-detector 16.

In the above described embodiments, finally detected focus error signals are substantially identical, and the respective characteristics with respect to the shift or tilt of the optical axis of the reflected light due to the vibration of an optical disk are likewise substantially identical.

In order to accomplish the same functions as those in the aforementioned embodiments, other modifications of the present invention may be effected by means of some other type of a composite prism not shown in the drawings or by other optical constructions.

Next, FIGS. 13A to 13D are graphs showing the calculated values of the focus detecting signal for the focus error signal detected by means of the focus error detector according to the present invention. In the respective graphs, focus error signals are represented by a series of circles and the signals detected in the respective splitting areas of the photo-detectors receiving the reflected light through the critical angle prism is represented by solid lines. Also, it is assumed that the optical axis tilts and shifts are −2' (minutes) and −0.3 mm, 2' and −0.3 mm, −2' and 0.3 mm, and 2' and 0.3 mm, in the graphs shown in FIGS. 13A to 13D, respectively. From the focus signal curves shown in these graphs, it is understood that the degree of the focus blur of the aforementioned objective lens is substantially zero at the position where the signal value is zero, irrespective of the optical tilt and shift. That is to say, focus error does not occur due to the optical axis tilt or shift.

As described above, according to the present invention, only the focus error of the objective lens purely with respect to the optical disk can be detected, irrespective of the optical axis tilt and shift due to disk vibration or changes in the optical disk over time. Accordingly, optical pickup malfunctions are not produced, which contributes in the stable operation thereof and allows the recording and reproduction of uncorrupted data.

What is claimed is:

1. A focus error detector for detecting a focus error of an objective lens which focuses parallel incident light onto an optical disk, said focus error detector comprising:

beam splitting means for splitting light reflected from said optical disk and passed through said objective lens into a first reflected light ray and a second reflected light ray;

critical angle reflecting means for reflecting said first and second reflected light rays at respective critical angles thereof;

first and second bisectional photo-detectors for respectively receiving said first and second reflected light rays reflected by said critical angle reflecting means and for respectively outputting first and second signals responsive to an amount of received light; and circuit means for differentiating and adding the first and second signals in a direction offsetting differences in a quantity of light received from said optical disk light due to a tilt or shift of the light reflected and for outputting a signal representing a degree of focus error.

2. The focus error detector as claimed in claim 1 further comprising a reflecting surface disposed between said beam splitting means and said critical angle reflecting means for reflecting one of said first and second reflected light rays in parallel with the other.

3. The focus error detector as claimed in claim 1 wherein said critical angle reflecting means includes at least two critical angle prisms each having at least one critical angle reflecting surface for reflecting said first and second reflected light rays at respective critical angles thereof.

4. A focus error detector for detecting a focus error of an objective lens which focuses a parallel incident light onto an optical disk, said focus error detector comprising:

a composite prism member including a plurality of prisms so as to have a splitting surface for splitting said light reflected from said optical disk and passed through said objective lens into first and second reflected light rays and at least two critical angle surfaces for reflecting said first and second reflected light rays at their respective critical angles;

two bisectional photo-detectors for receiving said first and second reflected light rays respectively reflected by at least two critical angle reflecting surfaces and detecting signals depending on the amount of light received; and circuit means for differentiating and adding the signals detected by said two bisectional photo-detectors for offsetting differences in the light amount due to a tilt or shift of said reflected light and for outputting a signal representing a degree of the focus error.

5. The focus error detector as claimed in claim 4 wherein said composite prism member includes a reflecting surface for reflecting said first and second reflected light rays reflected from said splitting surface in parallel with each other.

6. The focus error detector as claimed in claim 4 wherein said composite prism member includes a beam splitting member having said splitting surface, and two critical angle prisms joined to said beam splitting member and having a pair of critical angle reflecting surfaces disposed in parallel with each other.

7. The focus error detector as claimed in claim 4 wherein said composite prism member includes a first critical angle prism having a critical angle surface for reflecting said incident reflected light at an inclination angle, and second and third critical angle prisms joined with each other, wherein said splitting surface for splitting said reflected light into said first and second reflected light rays is disposed in the joining portion, the composite prism member including critical angle reflecting surfaces for reflecting said first and second reflected light rays at their respective critical angles.

8. The focus error detector as claimed in claim 4 wherein said composite prism member includes an orthogonal prism coupled to two critical angle prisms having a pair of critical angle reflecting surfaces disposed in parallel with each other for respectively reflecting said first and second reflected light rays, wherein said splitting surface is formed in the joining portion between said orthogonal prism and one of said critical angle prisms.

9. The focus error detector as claimed in claim 4 wherein said composite prism member includes two critical angle prisms coupled together, each critical angle prism having a pair of critical angle reflecting surfaces disposed in parallel with each other for respectively reflecting said first and second reflected light rays, wherein said splitting surface is disposed in a joining portion of said two critical angle prisms.

10. A focus error detector for detecting a focus error of an objective lens which focuses parallel incident light onto an optical disk, said focus error detector comprising:

a beam splitting member having a polarizing beam splitting surface for reflecting the light reflected from said optical disk and passed through said objective lens in accordance with a polarization direction of the light and for transmitting all the light returning along the reflection path therethrough;

two critical angle prisms each having a critical angle reflecting surface for reflecting the light reflected in said polarizing beam splitting surface at each critical angle, respectively;

a semitransmissive mirror for transmitting part of the reflected light passing through said two critical angle prisms and for reflecting the rest of the reflected light back from said mirror;

a wave plate for rotating a polarization direction of the light reflected back from said semitransmissive mirror;

two bisectional photo-detectors for detecting signals responsive to the amount of light received by respectively receiving part of the light transmitted via said semitransmissive mirror and reflected from said critical angle reflecting surface of one critical angle prism and the rest of the light reflected from said semitransmissive mirror and passing through said critical angle reflecting surface of the other angle prism and said polarizing beam splitting surface; and circuit means for differentiating and adding the signals detected by said two bisectional photo-detectors in a direction offsetting a difference in the light amount due to a tilt or shift of the reflected light and for outputting a signal representing a degree of the focus error.

* * * * *

UNITED STATES PATENT AND TRADEMARK OFFICE
CERTIFICATE OF CORRECTION

PATENT NO. : 5,537,384
DATED : July 16, 1996
INVENTOR(S) : Lee et al.

It is certified that error appears in the above-indentified patent and that said Letters Patent is hereby corrected as shown below: On title page, Item: 75; Inventors; change "JAN-HOON YOO" to --JANG-HOON YOO--.

Signed and Sealed this

Fifth Day of November, 1996

Attest:

BRUCE LEHMAN

Attesting Officer     Commissioner of Patents and Trademarks